United States Patent
Cerda Varela et al.

(10) Patent No.: US 11,473,565 B2
(45) Date of Patent: Oct. 18, 2022

(54) FLUID FILM BEARING AND WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/242,343

(22) Filed: Apr. 28, 2021

(65) Prior Publication Data

US 2021/0332803 A1 Oct. 28, 2021

(30) Foreign Application Priority Data

Apr. 28, 2020 (EP) .................................... 20171736

(51) Int. Cl.
| | |
|---|---|
| *F03D 80/70* | (2016.01) |
| *F03D 1/06* | (2006.01) |
| *F03D 80/50* | (2016.01) |

(52) U.S. Cl.
CPC ............ *F03D 80/70* (2016.05); *F03D 1/0691* (2013.01); *F03D 80/50* (2016.05); *F05B 2230/21* (2013.01); *F05B 2240/54* (2013.01)

(58) Field of Classification Search
CPC ........ F03D 80/70; F03D 1/0691; F03D 80/50; F05B 2230/21; F05B 2240/54;
(Continued)

(56) References Cited

U.S. PATENT DOCUMENTS

| 6,170,989 B1* | 1/2001 | Zeidan | .................... F16C 17/03 384/117 |
|---|---|---|---|
| 10,323,687 B2* | 6/2019 | Devitt | ................. F16C 32/0618 |

(Continued)

FOREIGN PATENT DOCUMENTS

| EP | 2 816 226 A1 | 12/2014 | |
|---|---|---|---|
| EP | 3260716 A1 * | 12/2017 | .............. F16C 17/03 |

(Continued)

OTHER PUBLICATIONS

European Search Report dated Oct. 12, 2020 for application No. 20171736.0.

*Primary Examiner* — Joseph Ortega
(74) *Attorney, Agent, or Firm* — Schmeiser, Olsen & Watts LLP

(57) ABSTRACT

Provided is a fluid film bearing, for a rotor hub in a wind turbine, including a first and second part rotatably connected to each other, wherein the first part forms a first annular sliding surface that extends in the circumferential direction of the bearing along the first part, wherein the second part includes a support structure and first pads distributed along the circumference of the support structure, wherein a respective pad sliding surface of each of the first pads or of a first subgroup of the first pads supports the first annular sliding surface, wherein each first pad includes a mounting section that is mounted to a backside of the support structure, a contact section that is either forming the respective pad sliding surface or carrying a coating that forms the respective pad sliding surface and a connecting section that connects the contact section with the mounting section.

11 Claims, 3 Drawing Sheets

(58) Field of Classification Search
CPC .............. F05B 2240/50; F16C 32/0685; F16C
2226/60; F16C 17/10; F16C 17/107;
F16C 17/02; F16C 17/028; F16C 17/105;
F16C 17/26; F16C 27/02; F16C 32/0666;
F16C 32/06777; F16C 32/0696; F16C
33/108; F16C 35/02; F16C 17/035; F16C
33/1075; F16C 2237/00; F16C 2360/31;
F16C 17/03; Y02E 10/72
See application file for complete search history.

(56) References Cited

U.S. PATENT DOCUMENTS

| | | |
|---|---|---|
| 2011/0254281 A1 | 10/2011 | Noda et al. |
| 2018/0030964 A1* | 2/2018 | Eriksen .................. F16C 17/26 |
| 2021/0396216 A1* | 12/2021 | Hager .................... F16C 17/10 |
| 2022/0082157 A1* | 3/2022 | Kutluay ................ F16H 57/082 |

FOREIGN PATENT DOCUMENTS

| | | |
|---|---|---|
| EP | 3260716 A1 | 12/2017 |
| WO | WO 2013/034391 A2 | 3/2013 |

* cited by examiner

FLUID FILM BEARING AND WIND TURBINE

CROSS-REFERENCE TO RELATED APPLICATIONS

This application claims priority to European Application No. 20171736.0, having a filing date of Apr. 28, 2020, the entire contents of which are hereby incorporated by reference.

FIELD OF TECHNOLOGY

The following concerns a fluid film bearing, especially for a rotor hub in a wind turbine, comprising a first and a second part rotatably connected to each other, wherein the first part forms a first annular sliding surface that extends in the circumferential direction of the bearing along the first part, wherein the second part comprises a support structure and first pads distributed along the circumference of the support structure, wherein a respective pad sliding surface of each of the first pads or of a first subgroup of the first pads supports the first annular sliding surface. The following also concerns a wind turbine.

BACKGROUND

Wind turbines typically comprise a tower, a nacelle mounted on top of the tower and a rotor hub with mounted rotor blades that is rotatable with respect to the nacelle to generate power. The hub can be coupled to a gear box that drives a generator or the wind turbine can be a direct drive wind turbine. In the second case the hub directly drives the rotor of the generator. Especially in direct drive wind turbines it can be advantageous to use a rotor that is arranged outside the stator and that is directly coupled to the hub. In this case the arrangement of the rotor and the hub needs to be rotatably supported by at least one bearing.

In most cases roller or ball bearings are used as bearings for the hub of a wind turbine. These bearings do however need to be produced with a high precision and are therefore relatively costly. It can also be laborious to service such a bearing.

It is therefore known from the documents WO 2013/034391 A2 and EP 2 816 226 A1 to use a sliding bearing, wherein pads are mounted on the surface of one ring of the bearing, wherein the pads support a sliding surface of the other ring to provide radial support and to allow for a rotation of the two rings with respect to each other. The mentioned sliding bearings are however typically still hard to service since the pads are arranged between the two rings. This part of the bearing can be hard to access in a wind turbine. To provide access to the pads, it would be necessary to provide a dedicated crawl space allowing access to the space between the rings. The pads used in such bearings can also be rather complex, since it is typically necessary to allow a certain degree of tilting of the sliding surface of the respective pad to compensate for tolerances of the different parts, misalignments, etc. A solution mentioned in the second of the cited documents uses a pivot joint to allow for such movement. This does however increase the complexity and therefore the cost and potentially the weight of the pads.

SUMMARY

An aspect relates to a fluid film bearing with reduced complexity and cost that is also service friendly, especially when used as the bearing for a hub of a wind turbine.

This problem is solved by the initially discussed fluid film bearing, wherein each first pad comprises a mounting section that is mounted to a backside of the support structure that is facing away from the first part, a contact section that is either forming the respective pad sliding surface or carrying a coating that forms the respective pad sliding surface and a connecting section that connects the contact section with the mounting section and that allows for a tilting of the contact section with respect to the mounting section, wherein the mounting section, the connecting section and the contact section are formed as one piece.

In the course of embodiments of the invention it was recognized that the serviceability of a wind turbine can be noticeably improved when the individual pads are mounted to a support structure carrying the pads via a mounting section mounted to the backside of the support structure facing away from the first part. This allows access to the pad from the backside, e.g., from an interior space of the bearing or from the outside of the bearing and avoids the necessity to access the space between the two parts of the bearing. This type of mounting also allows for a relatively long connecting section that can therefore allow certain amount of tilting without damaging the connection section, even when all sections of the respective pad are formed as one piece.

As will be discussed in more detail below, depending on the maximum forces expected on the pad surface and the amount of necessary tilting, the geometry of the connecting section can be tailored in most cases to fulfil these requirements without requiring a dedicated mechanism for allowing the tilting of the pad sliding surface. Forming the three sections of the pad as one piece, especially casting them as one piece or machining them from a single piece of material, leads to very simple procedure for producing the individual pads and can therefore keep the cost and the weight of the pads low.

As discussed in more detail later, the described mounting and the design of the pads is especially advantageous when the second part forms the inner ring of the bearing. In this case the individual pads can be comfortably exchanged from an interior space of the wind turbine. This is especially advantageous when an outer rotor is used since an interior ring of the bearing is then a standstill and can therefore be easily provided with access hatches or other means to allow personal to access this interior space.

The pads or more specifically the mounting section, the contact section and the connecting section, can be formed from steel or some other metal. A coating can further reduce the friction of the pad sliding surface and the annular sliding surface formed by the first part. Such a coating can be formed from Babbitt, white metal, a polymer, or some other material with advantageous properties.

In a fluid film bearing lubricant needs to be provided to the contact area between the different sliding surfaces. Multiple approaches to this lubrication are known in the conventional art and will not be discussed in detail. The lubrication can be a flooded lubrication, a direct lubrication, a lubrication by spray bar or some other kind of lubrication. In an embodiment, oil is used as lubricant in the fluid film bearing. The fluid film bearing may be a hydrodynamic bearing or alternatively a hydrostatic bearing. It is also possible to use a combination of these bearing types with some of the pads lubricated by a hydrodynamic lubrication and some of the pads lubricated by a hydrostatic lubrication. To avoid excess leakage of the lubricant, connections between different parts of the bearing are sealed. For simplicity sake the sealing between the parts is not shown or discussed in the application, since implementations of such seals are well known in the conventional art.

In a fluid film bearing the support of one sliding surface by another sliding surface involves an indirect transfer of forces, since a thin lubrication film is arranged between these surfaces. In some cases, at low rotational speeds in a hydrodynamic bearing or when pumps providing the lubricant are not running in a hydrostatic bearing, the respective sliding surfaces might be in direct contact and therefore the support might be achieved by a direct exchange of forces.

The diameter of the respective connecting section of the first pads in at least one direction can be smaller by a factor of at least three or at least five or at least ten then the extension of the pad sliding surface of the respective first pad in the respective direction. Using a thinner diameter in at least one direction allows for a tilting of the pad in this direction with less force. The diameter in different directions, especially in the circumferential direction and the axial direction of the bearing, can be chosen in such a way that the expected forces on the pad sliding surface orthogonal to the pad sliding surface can still be counteracted by the connecting section while a tilting of the pad is possible without excessive force or without damaging the connecting section. In an embodiment, the given relative size of the diameter and the extension of the pad sliding surface holds true for all directions orthogonal to the direction of the connection between the mounting section and the contact section.

The connecting section can be elastically deformable to allow for a tilting of the pad sliding surface by an angle of at least 0.5° or at least 1° or at least 3°. The mentioned tilt angles are typically sufficient to compensate for tolerances, misalignments etc. At the same time, they do not require an excessive thinning of the connecting section and therefore allow for a sufficient stability of the pad with respect to forces orthogonal to the pad sliding surface.

The support structure can comprise a through hole for each of the first pads from the backside to a frontside of the support structure that is facing the first part of the bearing, wherein the respective connecting section is arranged at least partially within the respective through hole and/or wherein the respective contact section is arranged at least partially within the respective through hole. The walls of the through hole can form a stop for the tilting notion of the pad and therefore limit the amount of bending of the connecting section. This can be useful to avoid permanent damage to the connecting section in extreme load situations. The use of a through hole allows for an easier removal and mounting of the respective pad from the backside which is advantageous for servicing as discussed above.

The mounting section of the respective first pad can extend along the backside beyond the respective through hole and close the respective through hole. The mounting section therefore closes the through hole like a hatch. Since the mounting section is typically screwed or bolted to the supporter section, such a configuration could be called bolted hatch configuration. A closing of the through hole by the mounting section can be advantageous, since a leakage of lubrication fluid through the through hole can be avoided once the pad is installed. While the sealing of the fluid film bearing is not discussed in detail in this document, since it is not the focus of embodiments of the invention, it can obviously be advantageous to arrange a seal between the mounting section and the support structure to avoid a leakage of lubricant.

The mounting section of the respective first pad can be connected to the support structure by multiple bolts or screws spaced around the circumference of the respective though hole. Since the mounting section is mounted at the backside of the support structure, forces exerted on the pad sliding surface of the respective pad by the annular sliding surface need to be counteracted by the screws or bolts. Therefore, it is advantageous to use multiple screws or bolts spaced around the through hole.

The first part can form a second annular sliding surface, may be arranged at an angle to the first annular sliding surface. In this case the second part can comprise second pads or a second subgroup of the first pads, wherein a respective pad sliding surface of each of the second pads or of the second subgroup of the first pads supports the second annular sliding surface. The use of multiple annular sliding surfaces especially allows a support of the first part by the second part in the radial and in the axial direction.

In a first variant the first and second annular sliding surface can both be at an angle to both the radial and the axial direction of the bearing. Therefore, each of the sliding surfaces can provide support in the radial direction and in one of the axial directions. In this case both sliding surfaces are may be supported by different subgroups of the first pads. The first and second annular sliding surface can face away from each other in the axial direction or face towards each other in the axial direction. The first and second annular sliding surface can therefore form a first part that has the shape of a tapered I or a tapered U.

In a second variant three annular sliding surfaces can be used. One of these annular sliding surfaces can be essentially orthogonal to the radial direction and therefore mainly or exclusively provide radial support. Two of the annular sliding surfaces can be arranged at an angle to the axial direction, such as orthogonal to the axial direction, and therefore provide axial support in the two axial directions. Pads that mainly or exclusively provide a radial support can be considered to be radial pads and pads that mainly or exclusively provide axial support can be considered to be axial pads.

In the second variant all of the pads can be first pads. Alternatively, it is possible to use a different type of pad either for the radial pads or for the axial pads. The other type of a pad can especially be arranged in such a way that it is inserted between the support structure and the first part approximately in parallel to one of the directions in which the pad sliding surface extends.

While it can be more laborious to exchange such types of pads compared to the first pads, the use of such pads can be advantageous when large forces orthogonal to the pad sliding surface of the respective pad should be supported, since the pad is directly pushed against the support structure and not just held by bolts or screws.

The first pads can be offset in the circumferential direction of the bearing with respect to the second pads. Alternatively, that first pads of the first subgroup can be offset in the circumferential direction of the bearing with respect to the first pads of the second subgroup. It can be especially advantageous to offset the radial pads and the axial pads in the circumferential direction and/or to offset groups of first pads supporting different sliding surfaces. Both approaches can allow for a shorter bearing in the axial direction and/or for a larger size of the pad sliding surfaces of the radial pads.

The first part can be an outer part of the bearing, wherein the first and/or second annular sliding surface are formed on the inner circumference of the first part and/or wherein the respective pad sliding surface of the first and/or second pads or of the first and/or second subgroup of the first pads has a convex shape. The second part can therefore be identified as the inner part of the bearing. In an embodiment, all pads that support an annular sliding surface that is at an angle to the radial direction are convex to match the surface of the annular sliding surface.

Using pads mounted to the inner part, that can especially be static, instead of the outer part, that can especially be rotatable, allows for an easier access to the pads, especially when the fluid film bearing is used in a wind turbine. In this case the inner part typically has the approximate shape of a tube in the area of the bearing. Therefore, the inner part forms a natural crawl space or even a larger access space for personal to access the wall of the inner part to which the pads can be mounted. As discussed in more detail below, the mounting of the pads on the inner part can also help to avoid acute angles at the circumferential ends of the pad sliding surfaces of the pad, which can also help to reduce wear and tear.

In an embodiment, the respective pad sliding surface of pads providing radial support has a convex shape. When the sliding surface has a convex shape, a tangent on any point of the sliding surface does not intersect the sliding surface. Compared to pads having a concave shape of the sliding surface acute angles at the edges of the radial pad sliding surface are avoided, which can help to increase the lifetime of the pad.

In an embodiment, the radial pad sliding surface contacted by such pads can have the shape of a segment of a circle in a sectional plane orthogonal to the rotational axis of the bearing. In an embodiment, this is true for each sectional plane orthogonal to the rotational axis that intersects the radial pad sliding surface. The direction of the rotational axis can also be called axial direction.

The annular sliding surface can have a circular shape in the discussed sectional plane or planes, leading to similar shapes of both sliding surfaces and therefore an improved support.

Additionally embodiments of the invention concern a wind turbine, comprising a rotor with a rotor hub that is connected to a further component of the wind turbine using a fluid film bearing according to embodiments of the present invention, wherein the hub is part of the first or second part or mounted to the first or second part. In an embodiment, the hub can be mounted to the outer one of the first and second parts. The connection between the respective part and the hub can be torque proof. The other part is connected to the nacelle and/or the stator of a generator, especially via a torque-proof connection. The part connected to the hub can also be connected to the rotor of a generator or to the input stage of gear box via a torque-proof connection.

The hub can be connected to the further component by a single bearing. The discussed fluid film bearing is well suited as the only bearing used to support the hub of a wind turbine. Single bearing configurations can reduce the complexity and cost of a wind turbine. If multiple bearings are used, the fluid film bearing according to embodiments of the present invention can be used as the main bearing that is closest to the hub.

The hub and/or the second part and/or the further component can form an interior space that allows personal to access the support structure, wherein the first and/or second pads are mounted to the support structure in such a way that they can be exchanged by personal from within the inner space.

BRIEF DESCRIPTION

Some of the embodiments will be described in detail, with references to the following Figures, wherein like designations denote like members, wherein.

DETAILED DESCRIPTION

Figure 1:
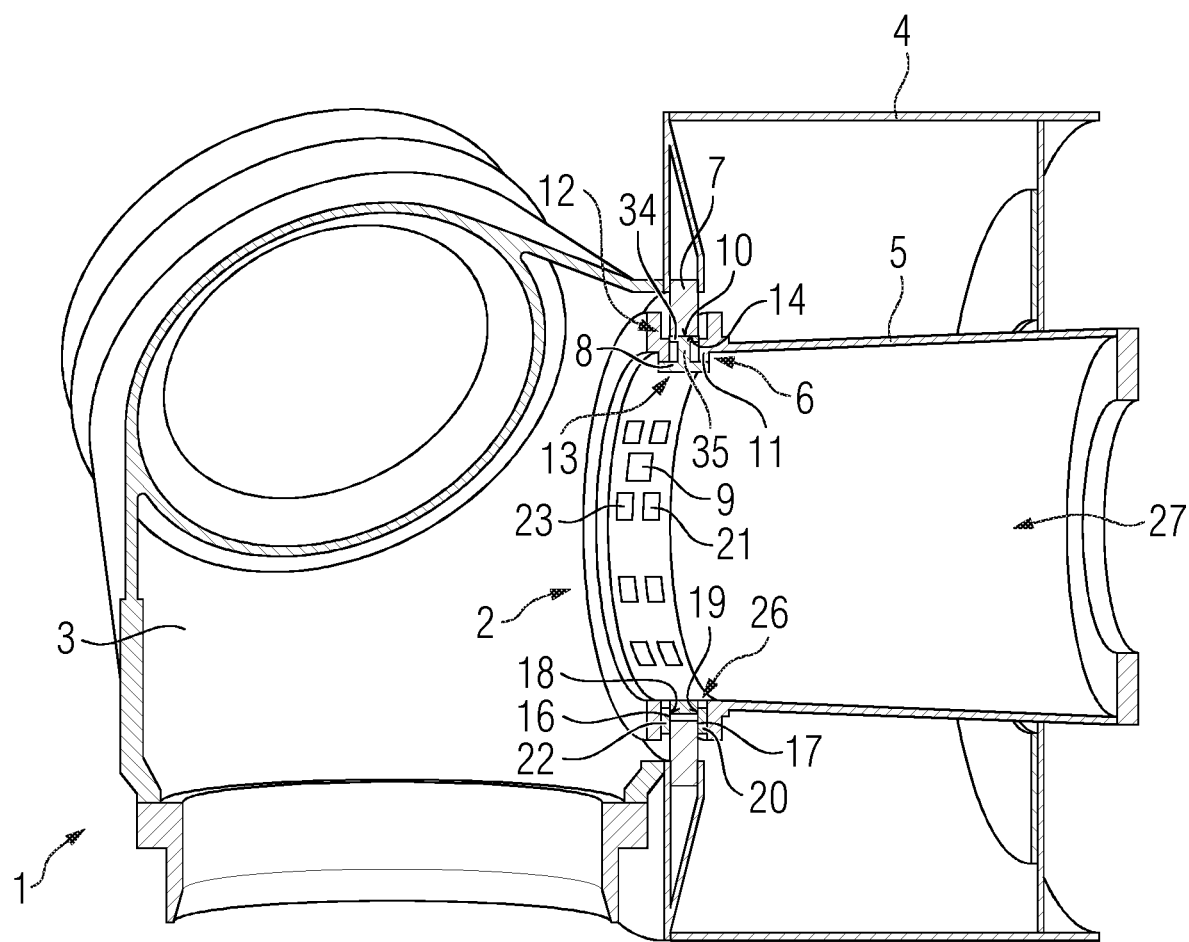
FIG. 1 depicts a detailed view of an embodiment of a wind turbine according to embodiments of the present invention comprising an embodiment of a fluid film bearing.

FIG. 1 shows a detailed view of a wind turbine 1 that comprises a rotor hub 3 rotatably connected to a further component 5 of the wind turbine 1 using a fluid film bearing 2. The hub 3 is mounted to a first part 7 of the bearing 2 using a torque-prove connection. A flange connection can be used. Alternatively, the hub 3 and the first part 7 could be formed, for example cast, as a single piece.

The first part 7 is also connected to the structure 4 using a torque-prove connection. The structure 4 can be used to carry a rotor of a generator of the wind turbine 1 that is not shown in FIG. 1 for reasons of simplicity and clarity.

The second part 6 of the bearing has an annular shape and can be formed as one piece with the further component 5 or connected to the further component 5 using a torque-prove connection. The further component 5 can especially be or carry the stator of the generator of the wind turbine 1 that is not shown for reasons of simplicity and clarity.

Since embodiments of the present invention focus on the implementation and distribution of the various pads, details concerning the lubrication of the fluid film bearing, e.g., seals and pumps that can optionally be used to transport the lubricant, are omitted in the figures.

To radially support the first part 7, the second part 6 comprises first pads 8, 9 distributed along the circumference of the second part 6. Each of the pads 8, 9 has a respective pad sliding surface 10 that supports a first annular sliding surface 14 of the first part 7 in the radial direction. The sliding surfaces 10, 14 can be coated to improve the robustness of the sliding surface and/or further reduce friction. While the sliding surfaces 10, 14 are typically not in direct contact during the normal operation, since a thin lubricant film is arranged between the sliding surfaces 10, 14, contact between the sliding surfaces 10, 14 can occur at slow rotating speeds or when pumps used to transport the lubricant are not working.

The first pads 8, 9 and other pads that will be described later, should allow for a certain amount of tilting of the sliding surface of the respective pad with respect to a mounting section 13 of the respective pad 8, 9 used to mount the pad 8, 9 to the support structure 11. Therefore, the sliding surface is provided by a contact section 34 that is connected to the mounting section 13 by a connecting section 35 to allow for the tilting.

In the pads 8, 9 the mounting section 13, the connecting section 35 and the contact section 34 are formed as one piece, e.g., cast as one piece or machined from one piece of material. To allow for a tilting of the pad, a sufficiently small diameter 41 of the connecting section 35 is chosen to allow for an elastic deformation, especially a flexing, of the connecting section 35. This is shown in more detail in FIG. 2 that shows a sectional view of the fluid film bearing shown in FIG. 1, the sectional plane being orthogonal to the axial direction of the bearing 2.

In other pads, e.g., the pads 20-23 discussed later, other mechanisms could be used to allow for a tilting, e.g., a pivot or ball-in-socket connection. Since the mounting and internal structure of these other pads 20-23 is not relevant for the further discussion, these pads are only shown as a single block in FIG. 1.

The mounting section 13 of the pads 8, 9 is mounted to the backside of the support structure 11, e.g., by bolts 40 arranged around the circumference of the through hole 12. The combined connecting section 35 and contact section 34 with the coating 36 extend through the through hole 12 to the frontside 43 of the support structure. During the mounting of the pads 8, 9 they can be inserted into the through holes 12 of the support structure 11 from the backside 42 and therefore from an interior space 27 formed by the hub 3 and the second part 6 and the further component 5 or a subgroup of these components.

Figure 2:
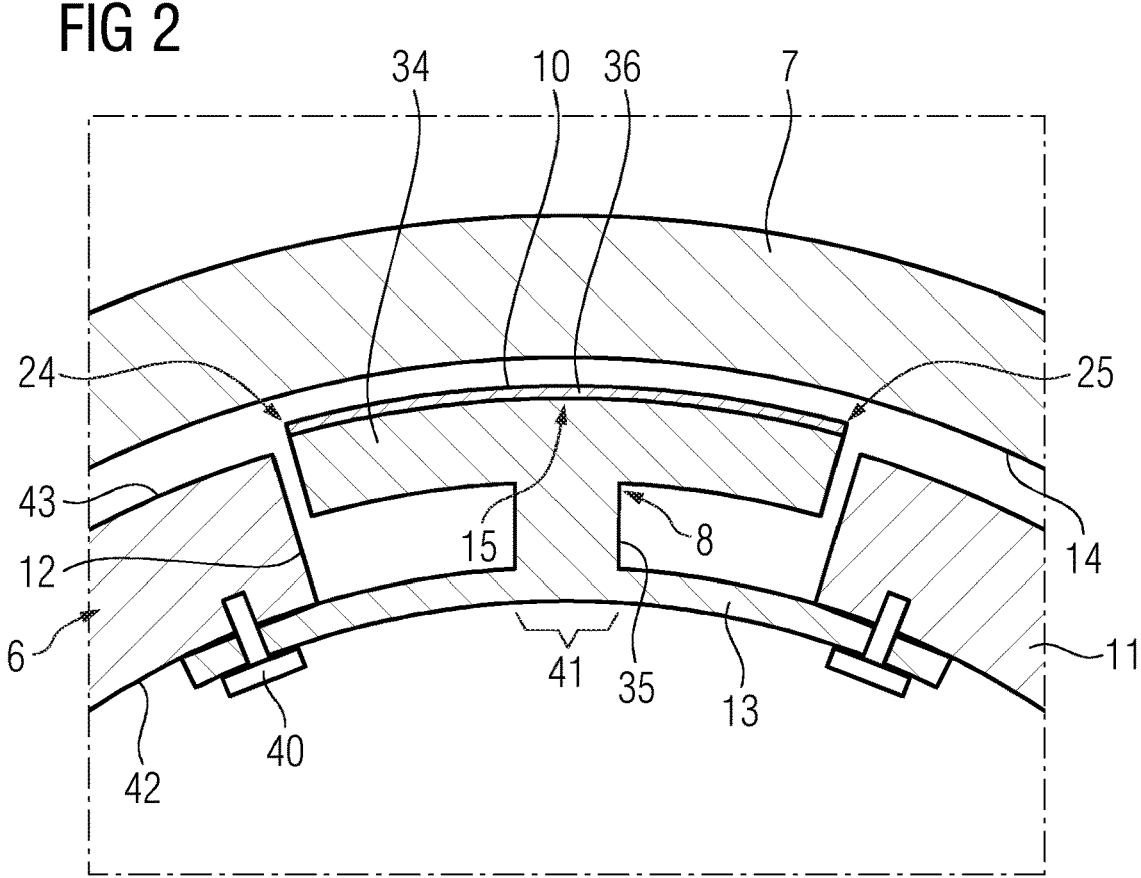
FIG. 2 depicts a sectional view of the fluid film bearing shown in FIG. 1.

The pad sliding surface 10 does have a convex shape, as seen in FIG. 2. The pad sliding surface 10 at least approximates the shape of a segment of a circle in a sectional plane orthogonal to the axial direction of the bearing 2. The convex shape of the pad sliding surface 10 closely matches the shape of the annular sliding surface 14 that is at least approximately circular in the same sectional plane. Another advantage of using a convex surface is an avoidance of acute angles at the edges 24, 25 of the pad sliding surface 10. This can help to reduce wear and tear of the pad sliding surface 10 and the annular sliding surface 14.

In the discussed example the pad sliding surface 10 and the annular sliding surface 14 are essentially orthogonal to the radial direction and can therefore only support the first part 7 and therefore the hub 3 in the radial direction. To provide an axial support for the first part 7 and therefore the hub 3, the first part 7 has two additional annular sliding surfaces 16, 17 that are approximately orthogonal to the axial direction of the bearing 2. The annular sliding surface 17 is supported by pad sliding surfaces 19 of second pads 20, 21. The annular sliding surface 16 is supported by pad sliding surfaces 18 formed by a third pads 22, 23. Therefore the first part 7 is supported in both axial directions. The second and third pads 20-23 can have a different internal structure and be mounted differently than the first pads 8, 9.

The first pads 8, 9 are offset in the circumferential direction with respect to the second and third pads 20 to 23. This allows for a shorter bearing 2 or the use of a sliding surface 10 of the pads 8, 9 that is larger in the axial direction without using a longer bearing 2.

In the sectional plane orthogonal to the circumferential direction of the bearing shown in FIG. 1 the annular first part 7 has approximately the shape of the letter "I" and forms a protrusion extending in the radial direction towards the second part 6. The annular sliding surface 14 is formed on the radial end of this protrusion and the annular sliding surfaces 16, 17 are formed on the axial ends of this protrusion.

The pads 20-24 can be exchanged by radially removing or inserting them through holes 26 of the support structure 11, such that they are sandwiched between the support structure 11 and the first part 7. They can also be inserted or removed from the interior space 27. As discussed later, other approaches for mounting these pads could also be used.

Figure 3:
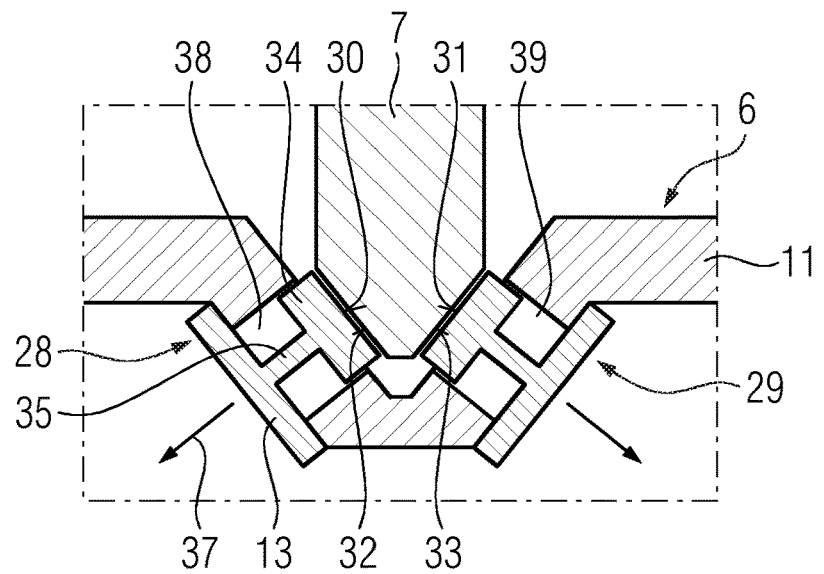
FIG. 3 depicts a detailed view of alternate embodiments of a fluid film bearing according to embodiments of the present invention that can be used in alternate embodiments of a wind turbine.

In the previously discussed example, the pad sliding surfaces 10 providing radial support where essentially orthogonal to the radial direction. It was therefore necessary to use additional pads 20-23 to achieve an axial support of the first part 7 and therefore the hub 3. FIG. 3 shows an alternative embodiment in which the first part 7 has a tapered shape forming two annular sliding surfaces 32, 33 that are essentially parallel to the circumferential direction of the bearing 2, but arranged at an angle to the radial and the axial direction of the bearing 2. The embodiment uses two groups of pads 28, 29, each group supporting a respective one of the annular sliding surfaces 32, 33. The respective normal of the pad sliding surfaces 30, 31 for the respective group of pads 28, 29 is tilted with respect to the radial direction. Therefore, the two groups of pads 28, 29 are sufficient to provide radial and axial support at the same time.

Multiple of these pairs of pads 28, 29 can be spaced along the circumference of the second part 6. To allow for easy servicing, the pads 28, 29 are mounted in through holes 38, 39 of the support structure 11 and can be removed for servicing in the direction of the arrow 37, e.g., from the interior space 27. The internal structure and mounting of the pads 28, 29 is essentially the same as already discussed for the pads 8, 9.

Figure 4:
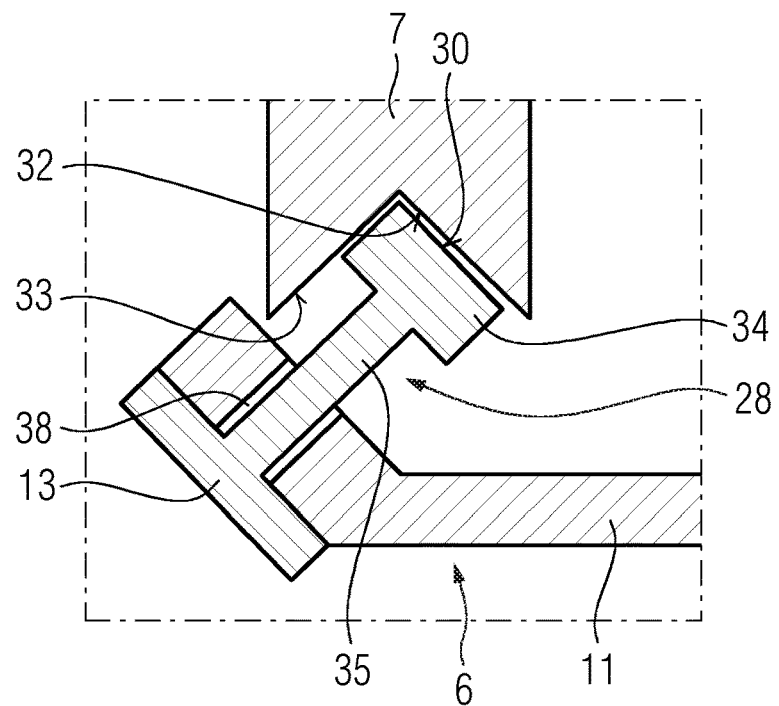
FIG. 4 depicts a detailed view of alternate embodiments of a fluid film bearing according to embodiments of the present invention that can be used in alternate embodiments of a wind turbine.

When using two annular sliding surfaces 32, 33 that are both arranged at an angle to the radial and to the axial direction as discussed above, a reduction in the width of the bearing 2 can be achieved by the following modification described with reference to FIG. 4. FIG. 4 shows a cross section orthogonal to the circumferential direction of the bearing 2. Since the approach to supporting the first part 7 is similar as in FIG. 3, the same reference numbers are used for components serving the same or similar purposes. In this embodiment the pads 28, 29 supporting the annular sliding surfaces 32, 33 are arranged at different positions along the circumference of the support structure 11. Therefore, only one of the pads is shown in FIG. 4.

The first difference to the embodiment shown in FIG. 3 is the shape of the first part 7. Instead of the tapered I-shape shown in FIG. 3, the first part 7 now has a tapered U-shape with two protrusions with tapered ends forming the two annular sliding surfaces 32, 33. Therefore the annular sliding surfaces 32, 33 face each other in the embodiment according to FIG. 4.

Due to this arrangement of the annular sliding surfaces 32, 33 the two pads 28, 29 cannot be placed in the same position in the circumferential direction of the bearing 2. Instead, they are displaced by a certain distance in the circumferential direction. In an embodiment, the pads 28, 29 are arranged in such a way that pads 28 of a first group with the orientation shown in FIG. 4 and pads 29 of a second group with an orientation that is mirrored at a vertical axis in FIG. 4, such that the pad sliding surface 31 of these pads 29 can contact the annular sliding surface 33, alternates in the circumferential direction.

Figure 5:
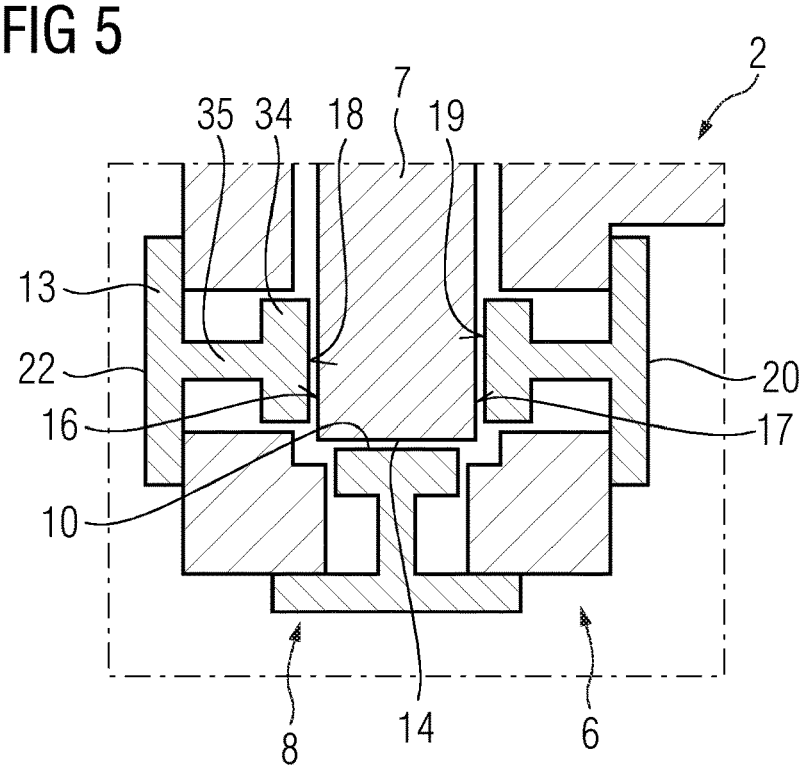
FIG. 5 depicts a detailed view of alternate embodiments of a fluid film bearing according to embodiments of the present invention that can be used in alternate embodiments of a wind turbine.

FIG. 5 shows a further variation of the discussed fluid film bearing 2. The overall design of the bearing 2 is similar to the bearing 2 discussed with reference to FIGS. 1 and 2 with an approximately I-shaped first part 7 supported radially by a group of pads 8 and axially by two groups of pads 20, 22. In the example shown in FIG. 12 the pads 20, 22 and the pad 8 are arranged at the same circumferential position. It would also be possible to use different circumferential positions for the pad 8 and the pads 20, 22 and/or to place the pads 20, 22 for the different directions of axial support at different circumferential positions.

The main difference between the embodiment discussed with reference to the FIGS. 1 and 2 and the embodiment according to FIG. 5 is the way that the pads 20, 22 for the axial support are mounted to the support structure 11 of the second part 6. Instead of radially inserting them between the first part 7 and the support structure 11, they are inserted into axial through holes of the support structure 11. The internal structure and the mounting of the pads 20, 22 can therefore be the same as for the pads 8.

The second part 6 is connected to the further component 5 via a connection that lies outside of the pad 20, therefore allowing a removal of the pad 8 as well as of the pads 20, 22 from an interior space 27 as discussed with reference to FIG. 1.

Obviously, the features discussed with respect to the individual embodiments can be combined in the variety of ways. Also, the connection of the first and second part 6, 7 of the bearing 2 to various other parts of the wind turbine 1 can be varied. It is possible to form the first part 7 as one piece with the hub 3 and/or the structure 4 or to connect the outer part 7 to one or both of these pieces by a different connection, e.g., by a flange connection. Correspondingly it is possible to provide the further part 5 and the second part 6 as one piece or to connect them by a flange, etc. It would also be possible to use the first part 7 as an inner part and the second part 6 as an outer part of the bearing 2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A fluid film bearing, for a rotor hub in a wind turbine, comprising a first and second part rotatably connected to each other, wherein the first part forms a first annular sliding surface that extends in the circumferential direction of the bearing along the first part, wherein the second part comprises a support structure and first pads distributed along the circumference of the support structure, wherein a respective pad sliding surface of each of the first pads or of a first subgroup of the first pads supports the first annular sliding surface, wherein each first pad comprises a mounting section that is mounted to a backside of the support structure that is facing away from the first part, a contact section that is either forming the respective pad sliding surface or carrying a coating that forms the respective pad sliding surface and a connecting section that connects the contact section with the mounting section and that allows for a tilting of the contact section with respect to the mounting section, wherein the mounting section, the connecting section and the contact section are formed as one piece, wherein the support structure comprises a through hole for each of the first pads from the backside to a frontside of the support structure that is facing the first part of the bearing, wherein the respective connecting section is arranged at least partially within the respective through hole and/or wherein the respective contact section is arranged at least partially within the respective through hole, wherein the through hole allows for a removal and mounting of the respective pad from the backside.

2. The fluid film bearing according to claim 1, wherein a diameter of the respective connecting section of the first pads in at least one direction is smaller by a factor of at least three or at least five or at least ten then the extension of the pad sliding surface of the respective first pad in the respective direction.

3. The fluid film bearing according to claim 1, wherein the connecting section is elastically deformable to allow for a tilting of the pad sliding surface by an angle of one of at least 0.5° or at least 1° or at least 3°.

4. The fluid film bearing according to claim 1, wherein the mounting section of the respective first pad extends along the backside beyond the respective through hole and closes the respective through hole.

5. The fluid film bearing according to claim 4, wherein the mounting section of the respective first pad is connected to the support structure by multiple bolts or screws spaced around the circumference of the respective through hole.

6. The fluid film bearing according to claim 1, wherein the first part forms a second annular sliding surface, arranged at an angle to the first annular sliding surface, wherein the second part comprises second pads or a second subgroup of the first pads, wherein a respective pad sliding surface of each of the second pads or of the second subgroup of the first pads supports the second annular sliding surface.

7. The fluid film bearing according to claim 6, wherein the first pads are offset in the circumferential direction of the bearing with respect to the second pads or in that the first pads of the first subgroup are offset in the circumferential direction of the bearing with respect to first pads of the second subgroup.

8. The fluid film bearing according to claim 1, wherein the first part is an outer part of the bearing, wherein the first and/or second annular sliding surface are formed on the inner circumference of the first part and/or wherein the respective pad sliding surface of the first and/or second pads or of the first and/or second subgroup of the first pads has a convex shape.

9. A wind turbine, comprising a rotor with a rotor hub that is connected to a further component of the wind turbine using a fluid film bearing according to claim 1, wherein the hub is part of the first or second part or mounted to the first or second part.

10. The wind turbine according to claim 9, wherein the hub is connected to the further component by a single bearing.

11. The wind turbine according to claim 9, wherein the hub and/or the second part and/or the further component form an interior space that allows personal to access the support structure, wherein the first and/or second pads are mounted to the support structure in such a way that they can be exchanged by personal from within the inner space.

* * * * *